United States Patent [19]

Anderson

[11] Patent Number: 4,662,837

[45] Date of Patent: May 5, 1987

[54] APPARATUS FOR INJECTION MOLDING

[75] Inventor: J. Paul Anderson, Bramalea, Canada

[73] Assignee: Husky Injection Molding Systems, Ltd., Bolton, Canada

[21] Appl. No.: 713,172

[22] Filed: Mar. 18, 1985

[51] Int. Cl.$^4$ .................. B29C 45/74; B29C 45/20; B29C 45/26

[52] U.S. Cl. .................. 425/548; 425/549; 425/566; 425/568; 425/570; 264/328.15

[58] Field of Search .................. 264/328.9, 328.15; 425/548, 549, 566, 568, 570

[56] References Cited

U.S. PATENT DOCUMENTS 4,268,240 5/1981 Rees et al. .................. 425/549 X
4,268,241 5/1981 Rees et al. .................. 425/549
4,312,630 1/1982 Travaguni .................. 425/549 X Primary Examiner—Jan Silbaugh
Assistant Examiner—Neil M. McCarthy
Attorney, Agent, or Firm—Bachman & LaPointe

[57] ABSTRACT

The process and apparatus includes a die assembly having a die cavity defined therein and an inlet port in the die assembly communicating with the die cavity. An injection nozzle is provided for delivering molten synthetic resin to the die cavity through the inlet port having an opening aligned with the inlet port and a thermally insulating sleeve positioned around the injection nozzle having an elastically yieldable component and a rigid component.

13 Claims, 5 Drawing Figures

APPARATUS FOR INJECTION MOLDING

BACKGROUND OF THE INVENTION

The present invention relates to the art of injection molding by means of hot runners wherein molten plastic material is fed from a pressure chamber to an injection nozzle and to an injection or mold gate of a die cavity. The molten plastic traverses a sprue channel in a heated structure designed to maintain the unused portion of plastic in its fluid state for injection in the next cycle. The present invention relates specifically to substantially insulation adjacent the injection nozzle resulting in a substantially improved injection molding device and procedure.

In order to maintain the plastic in a molten state the distributor assembly termed the hot runner and the nozzle assembly must be heated. Moreover, in order to function properly, heat expansion of the distributor and nozzle assembly must be accommodated and, while doing so, leakage between the distributor channel system and the nozzles as well as between the nozzles and the mold gate must be prevented. In addition to the foregoing, in designing a hot runner system, it is one of the most important requirements to minimize heat transfer from the nozzles to the gates. As is well known, the gate, i.e. the entry orifice for the plastic into the mold cavity, is usually placed within a separate mold component termed the gate pad. In order to operate at a rapid cycle, the gate pad must be strongly cooled so as to freeze the gate in the least amount of time and thereby to permit the mold to be opened and the finished article to be removed. At the same time, the plastic within the nozzle must remain at molding temperature, because cooling it would reduce the ability of the resin to flow rapidly into the mold cavity and, in the worst case, form a plug within the nozzle which would require cleaning while interrupting the molding operation. In order to minimize heat transfer from nozzle to gate pad, attempts have been made, as will be discussed below, to provide some insulation between the two and/or to minimize contact surfaces between the nozzle tip and the bottom portion of the gate pad. In accordance with the present invention substantially improved insulation between nozzle and gate pad is provided and a substantially improved injection molding device and procedure is obtained.

U.S. Pat. No. 3,741,704 granted June 26, 1973 to Beasley shows a pressed asbestos insulator to reduce thermal losses between the nozzle and the mold cavity. However, alignment of the nozzles and compensation for heat expansion of the nozzle assembly are not provided. The asbestos ring is incompressible for all practical purposes and therefore unable to provide a proper seal over the necessary range of dimensional changes. In addition, of course, the harmful nature of asbestos is well known.

U.S. Pat. Nos. 3,849,048 granted Nov. 19, 1974 to Bielfeldt et al. and 4,212,625 granted July 15, 1980 to Shutt and 4,268,240 granted May 19, 1981 to Rees et al. show the use of the molding resin itself to form an insulating layer between the nozzle and the gate and gate pad, accounting also for alignment of the components and accommodation of the heat expansion. However, if a heat sensitive resin is thus used to form the insulating layer, as shown in these patents, it will tend to degrade in prolonged use, adversely affecting the molded articles. An arrangement according to these patents fails to allow the heat sensitive resin to be continuously flushed out with none remaining to degrade and to contaminate subsequently molded articles.

U.S. Pat. No. 4,043,740 granted Aug. 23, 1977 to Gellert shows a nozzle assembly using a titanium seal to space the nozzle from the cavity. While more suitable for heat sensitive resins than the above, heat exchange between the nozzle and the gate pad is excessive because titanium is a relatively good heat conductor.

U.S. Pat. No. 4,416,608 granted Nov. 22, 1983 to Deardurff shows another method of reducing contact and thereby heat transfer between the nozzle and the gate pad, namely an abrasive surface treatment using, e.g. vapor honing to reduce the contact area between the two components thus reducing heat flow; however, this method is only partially effective at best.

It is therefore a principal objective of the present invention to provide an improved injection molding device and process and especially characterized by improved insulation between the nozzles and the mold gate.

It is a still further object of the present invention to provide a device and process as aforesaid which is readily able to accommodate dimensional changes.

It is an additional object of the present invention to provide a device and process as aforesaid wherein the improved insulation does not degrade with time.

Further objects and advantages of the present invention will appear hereinafter.

SUMMARY OF THE INVENTION

In accordance with the present invention it has now been found that the foregoing objects and advantages may be readily obtained. The apparatus of the present invention is an apparatus for hot runner injection molding which comprises: a die assembly including a die cavity defined therein; an inlet port in said die assembly communicating with said die assembly; an injection nozzle for delivering molten synthetic resin to said die cavity through said inlet port having an opening aligned with said inlet port; and a thermally insulating sleeve positioned around said injection nozzle insulating said injection nozzle from said die assembly having an elastically yieldable component and a rigid component. Means are normally provided operatively associated with said injection nozzle for shutting off the delivery of molten synthetic resin to said die cavity, such as a valve pin. In the preferred embodiment the thermally insulating sleeve comprises two separable components in contacting relationship with each other.

Thus, the present invention provides an injection mold equipped with a hot runner and including a heated distributor block and nozzles wherein the nozzles are effectively insulated from the entrance to the mold cavities, i.e., the gates, while also providing good nozzle-to-cavity alignment and in addition compensation for the thermal expansion of the nozzles and of the distributor block. Further, means are provided to allow heat sensitive resins to be processed without degradation. These represent significant advantages in this art and achieve a goal which has been long sought after.

In a preferred embodiment, the present invention employs the simultaneous use of two concentric insulating rings a first of which provides the contact seal between the nozzle and the inlet port of the die assembly or gate pad, and the second of which is in contacting relationship with the first, backs up the first and is capable of accommodating the heat expansion of the nozzle, wherein the physical properties of the two rings differ so as to accommodate the said different functions. The provision of these different functions enable the attainment of advantages as referred to above not attained heretofore in a single device.

The process of the present invention insulates injection nozzles adjacent die assemblies, wherein said die assemblies include a die cavity defined therein and an inlet port communicating with said die assembly and wherein said injection nozzle includes an opening aligned with said inlet port for delivering molten resin to said die cavity which comprises: disposing around said injection nozzle a thermally insulating sleeve insulating said injection nozzle from said die assembly having an elastically yieldable component and a rigid component. Molten resin is injected into said die cavity through said injection nozzle, injection nozzle opening and inlet port to form an article in said die cavity, the injection is discontinued and the resin is maintained in the molten state in the injection nozzle insulated from the die assembly by the thermally insulating sleeve.

BRIEF DESCRIPTION OF THE DRAWINGS

Other features and advantages of the present invention will become more apparent from an examination of the succeeding specification when read in conjunction with the appended drawings, in which.

DETAILED DESCRIPTION

Figure 1:
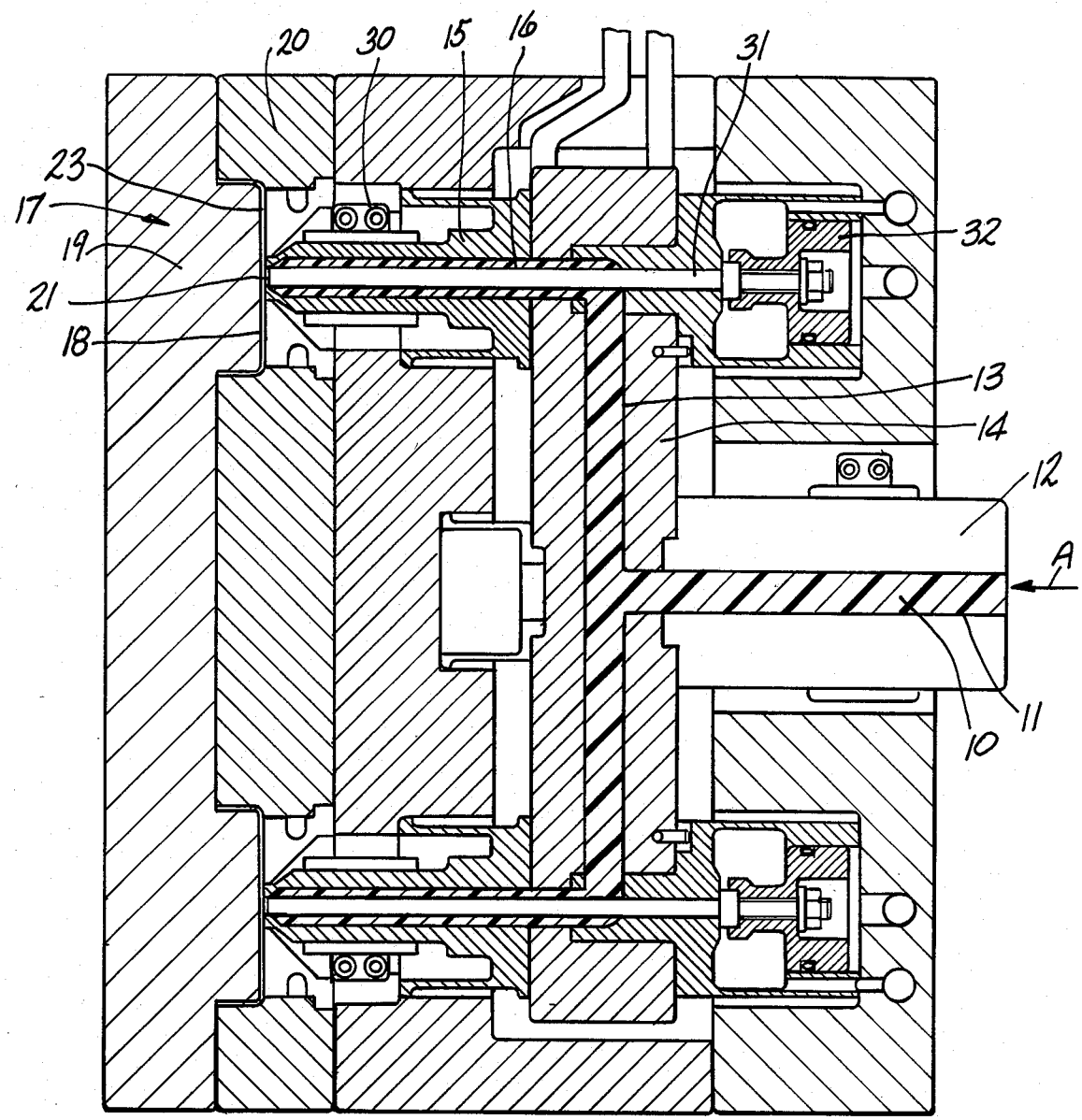
FIG. 1 is a schematic illustration showing a typical device for hot runner injection molding including the manifold, associated nozzles, mold cavities and the flow path of molten resin.

Referring to the drawings, FIG. 1 shows a conventional injection mold including a hot runner for the production of molded articles. Pressure molding means (not shown) advances molten plastic material 10 through injection conduit 11 in sprue bush 12 in the direction of arrow "A" into main manifold channel 13 in distributor block 14 and thence to injection nozzles 15 via injection nozzle channels 16. Die assembly 17 is provided having a die cavity 18 therein with a configuration in the shape of the molded article to be formed in platens 19 and 20. The die assembly 17 has an inlet 21 communicating with the die assembly and aligned with injection nozzle outlet opening 22 as shown for example in FIG. 3. Thus, molten plastic 10 flows from injection nozzle channels 16 through opening 22 and die assembly inlet 21 and die cavity 18 to form the molded article 23 therein. Naturally, additional nozzles may be employed; however, for purposes of illustration only two are shown herein. In normal operation platen 20 is a fixed platen and platen 19 is a movable platen.

Heating means 30, such as electric heaters, are provided in heat exchange relationship with injection nozzles 15 in order to maintain the plastic material in the molten state. The particular location shown in FIG. 1 is for purposes of illustration only and naturally other arrangements may be employed.

Figure 4:
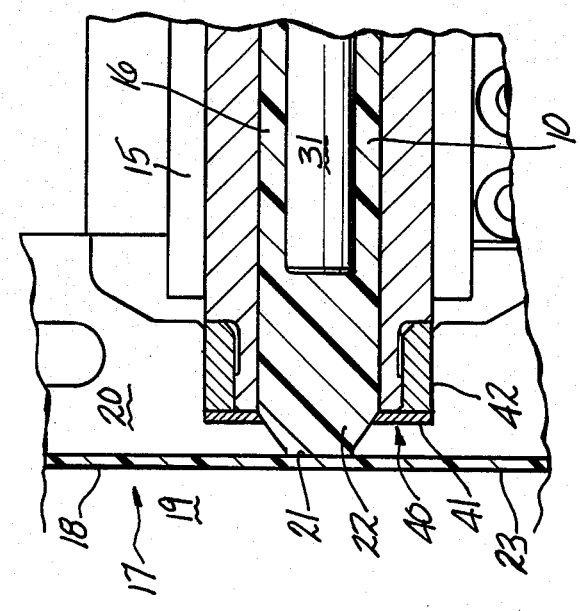
FIG. 4 is a view similar to FIG. 3 with the injection nozzle opening in the open position.

Means are preferably employed for shutting off the delivery of molten synthetic resin to the die cavity at the completion of the molding cycle. In the configuration shown in FIG. 1 valve pin 31 is provided within injection nozzle 15 movable by piston 32 from an operative position as shown in FIG. 1 and in more detail in FIG. 3 closing injection nozzle outlet opening 22 to an inoperative position withdrawn within the injection nozzle and spaced from the injection nozzle outlet opening 22 as shown in FIG. 4. When the valve pin is in the inoperative position molten resin is permitted to flow into die cavity 18. When the valve pin is in the operative position the exit of the molten resin to the die cavity is blocked and the die assembly 17 is opened by moving platen 19 away from platen 20 by means not shown to permit article 23 to be ejected from die cavity 18. The valve pin is not essential to the invention and it is shown here becuse it is frequently used as a means to shut off delivery of molten resin to the die cavity, particularly in molten systems processing resins that have low viscosity at molding temperatures.

In accordance with the present invention a thermally insulating sleeve is positioned around the injection nozzle insulating the injection nozzle from the die assembly wherein the sleeve has an elastically yieldable component and a rigid component. Generally the sleeve comprises a first and a second component in contacting relationship with each other. These are generally separate, concentric rings, although they may if desired be combined or bonded together into a single ring.

Thus, referring to FIGS. 2–5, seal 40 is made from a first component 41 and a second component 42. The first component 41 is the elastically yieldable component and is positioned downstream of the second component 42 which is the rigid component. The first and second components are in contacting relationship with each other and are two concentric insulating rings.

Figure 5:
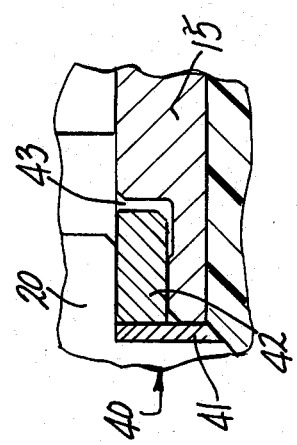
FIG. 5 is an enlarged view of the thermally insulating sleeve showing the expansion space between the second component and the injection nozzle.

First component 41 is made of an elastically yieldable material, for example, elastomeric, fluoroplastic or silicone and others, which does not melt nor degrade at the operating temperature of the nozzle. It provides a thermal barrier and seal between nozzle 15 and die assembly 17, and also is capable of compressing to allow thermal expansion of the nozzle 15 to take place into expansion space or gap 43 as shown in FIG. 5 while maintaining the integrity of the seal. Second component 42 which is directly behind the first component 41 is made of a rigid insulating material that will not deform perceptibly under the loads generated by the hot runner, for example, liquid crystal aromatic polyester copolymers, polyimides, polyethersulfones, and others. Second component 42, which may be termed a back-up ring, provides alignment between nozzle 15 and die cavity 18, while being rigid enough to keep the first component 41 from being displaced, as by being extruded away from its designed position.

Thus, there is no contact between nozzle 15 and die cavity 18 or the cooled die assembly 17 so that heat exchange between them is negligible due to the excellent insulating properties of sleeve 40 and its first and second components 41 and 42. Therefore, maintenance of the plastic material 10 in its molten state within nozzle channels 16 is readily permitted.

Figure 3:
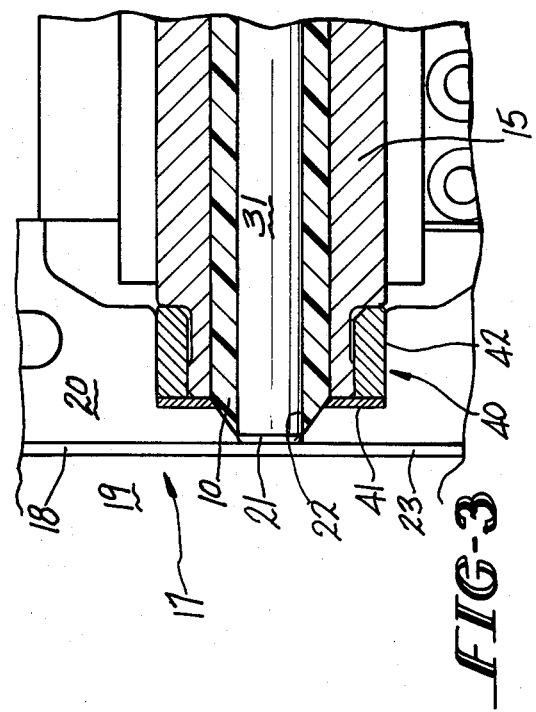
FIG. 3 is an enlarged view of the nozzle assembly of FIG. 2 with the injection nozzle opening in the closed position.
Figure 2:
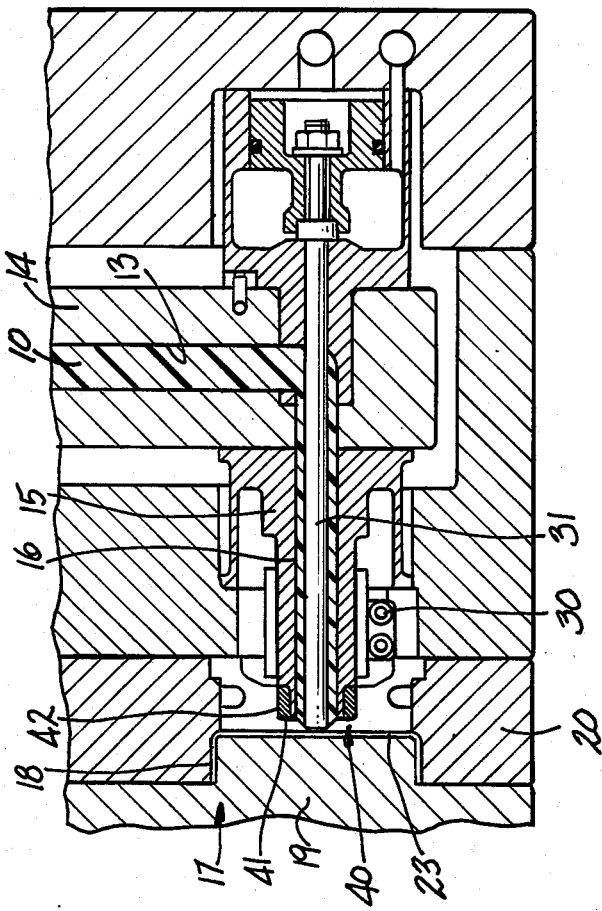
FIG. 2 is a detailed sectional view of one nozzle assembly of FIG. 1 including the thermally insulating sleeve of the present invention.

FIG. 3 shows valve pin 31 in the closed, forward position blocking egress of the plastic material. FIG. 4 shows valve pin 31 in the open, withdrawn position permitting egress of the plastic material. FIG. 4 also shows that the forward surfaces of the nozzle, i.e., the outlet opening 22, are contoured to allow the resin to be completely flushed out during each molding cycle and to prevent degradation when molding heat sensitive materials.

As indicated hereinabove, valve pin 31 may be readily omitted using the present invention. It is one of the advantages of the present invention that the thermal separation between the nozzle and die assembly is sufficient due to the insulating capabilities of sleeve 40 to allow the nozzle to be maintained at molding temperatures throughout even while the die assembly or gate area is vigorously chilled to permit a rapid cycle.

The process and device of the present invention operates as follows. At the beginning of the molding cycle all elements are relatively cold. Expansion space or gap 43 exists between the second component 42 and nozzle 15 as shown in FIG. 5. The second component is of course confined, at its inner diameter by a close fit upon nozzle 15 and at its outer diameter by platen 20 and in front by first component 41, while being free to expand or to permit expansion of nozzle 15 into expansion space or gap 43. The first component 41 is fully confined between the second component 42, nozzle 15 and platen 20.

As the assembly reaches operating temperature nozzle 15 expands into expansion space 43 while the opposing, chilled surface of platen 20 remains in the same position as before. This axial expansion exerts pressure upon first component 42, which also expands because it is heated by contact with the heated nozzle, and the pressure of the axial expansion is transmitted to the first component 41. Thus, expansion space 43 is eliminated and the first and second components remain in operative position. The various expansion pressures do not push sleeve 40 out of operative position due to the nature of the components as described hereinabove. Sleeve 40 remains in position to effectively insulate nozzle 15 from the chilled die assembly 17 while readily permitting expansion of the nozzle and sleeve.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. Apparatus for hot runner injection molding which comprises: a die assembly including a die cavity defined therein; means defining an inlet port in said die assembly communicating with said die cavity; an injection nozzle for delivering molten resin to said die cavity through said inlet port having an opening aligned with said inlet port; and a thermally insulating sleeve positioned around said injection nozzle insulating said injection nozzle from said die assembly having a first elastically yieldable component and a second rigid component wherein said first and second components are in contacting relationship with each other and wherein said first component does not melt or degrade at the operating temperatures of the nozzle, whereby there is no contact between the die assembly and injection nozzle so that the die assembly may be cooled while the nozzle may be maintained at molding temperature and insulated therefrom, and wherein said first component is operative to provide a contact seal between the injection nozzle and the die assembly and wherein the second component is a separate element which backs up the first component and is operative to accomodate the expansion of the nozzle.

2. An apparatus according to claim 1 including means operatively associated with said injection nozzle for shutting off the delivery of molten resin to said die cavity.

3. An apparatus according to claim 2 wherein said means operatively associated with said injection nozzle comprises a valve pin movable from an operative position closing said opening to an inoperative position spaced from said opening.

4. An apparatus according to claim 1 wherein said first component is disposed downstream of said second component.

5. An apparatus according to claim 4, wherein said first component is a material selected from the group consisting of elastomeric, fluoroplastic and silicone.

6. An apparatus according to claim 4 wherein said second component is a material selected from the group consisting of liquid crystal aromatic polyester copolymers, polyimides nd polyethersulfones.

7. An apparatus according to claim 1 including heating means adjacent said injection nozzle to maintain said resin in the molten state within said nozzle.

8. An apparatus according to claim 4 including an expansion space between said second component and said injection nozzle.

9. An apparatus according to claim 1 wherein said components are two concentric insulating rings.

10. An apparatus according to claim 1 including a plurality of said die assemblies, nozzles and thermally insulating sleeves.

11. An apparatus according to claim 1 wherein said first component provides a thermal barrier and seal between the injection nozzle and die assembly and is capable of compressing to allow thermal expansion of the nozzle.

12. An apparatus according to claim 11 wherein said second component is directly behind the first component and is operative to provide alignment between the nozzle and die cavity and prevents the first component from being displaced.

13. An apparatus according to claim 8 wherein the first component is fully confined.

* * * * *